Oct. 8, 1968         D. W. ROPER                3,404,585
                    DRIVE MECHANISM
Filed June 13, 1966                          2 Sheets-Sheet 1

INVENTOR
DANIEL W. ROPER

BY  Hoffmann and Yound

ATTORNEYS

Oct. 8, 1968  D. W. ROPER  3,404,585
DRIVE MECHANISM
Filed June 13, 1966  2 Sheets-Sheet 2

INVENTOR
DANIEL W. ROPER
BY Hoffmann and Young
ATTORNEYS

United States Patent Office 3,404,585
Patented Oct. 8, 1968

3,404,585
DRIVE MECHANISM
Daniel W. Roper, Rochester, Mich., assignor to Eaton Yale & Towne Inc., Cleveland, Ohio, a corporation of Ohio
Filed June 13, 1966, Ser. No. 557,153
19 Claims. (Cl. 74—711)

ABSTRACT OF THE DISCLOSURE

Disclosed herein is a drive mechanism including driving and driven members. The driving and driven members are drivingly interconnected by a friction clutch assembly and a clutch actuating assembly in response to a predetermined rate of relative rotation between the driving and driven members.

---

The present invention relates to a drive mechanism and more particularly to a differential drive mechanism, such as a limited slip differential, usable in automotive vehicle axles.

Another object of the present invention is the provision of a new and improved drive mechanism having rotatable driving and driven members which are adapted to be drivingly connected by a friction clutch means, and wherein the friction clutch means is actuated to drivingly connect the driving and driven members in response to relative rotation therebetween so that a sudden driving connection between the members is minimized and with reduced wear of the parts of the mechanism.

Another object of the present invention is the provision of a new and improved drive mechanism of the type set forth in the next preceding paragraph wherein the friction clutch means is energized to drivingly connect the driving and driven members by an actuating means operable to urge friction members of the clutch into pressure relationship in response to relative rotation between the driving and driven members, and wherein the actuating means includes a plurality of spherical roller members which cooperate with cam surfaces on one of the members to energize the clutch means when the driving and driven members rotate relative to each other.

Another object of the present invention is the provision of a new and improved drive mechanism including rotatable driving and driven members adapted to be drivingly connected by a friction clutch means located therebetween and wherein the friction clutch means is associated with a viscous shear fluid actuating mechanism movable in a direction to effect a frictional pressure engagement of friction members of the clutch means, with movement of the viscous shear fluid mechanism effected by slip between the members and the friction members being forcibly engaged upon such movement at a predetermined slip speed between the members, and with the friction clutch means effective to drivingly connect the members in an exceedingly soft manner.

A further object of the present invention is the provision of a new and improved drive mechanism of the type set forth in the next preceding paragraph wherein the viscous shear fluid actuating means includes a member movable along the axis of rotation of one of the rotatable members to engage the friction members of the clutch means.

Other objects and advantages of the present invention will become apparent from a consideration of the detailed description thereof which follows and from the drawings which form a part of the specification in which.

Figure 1:
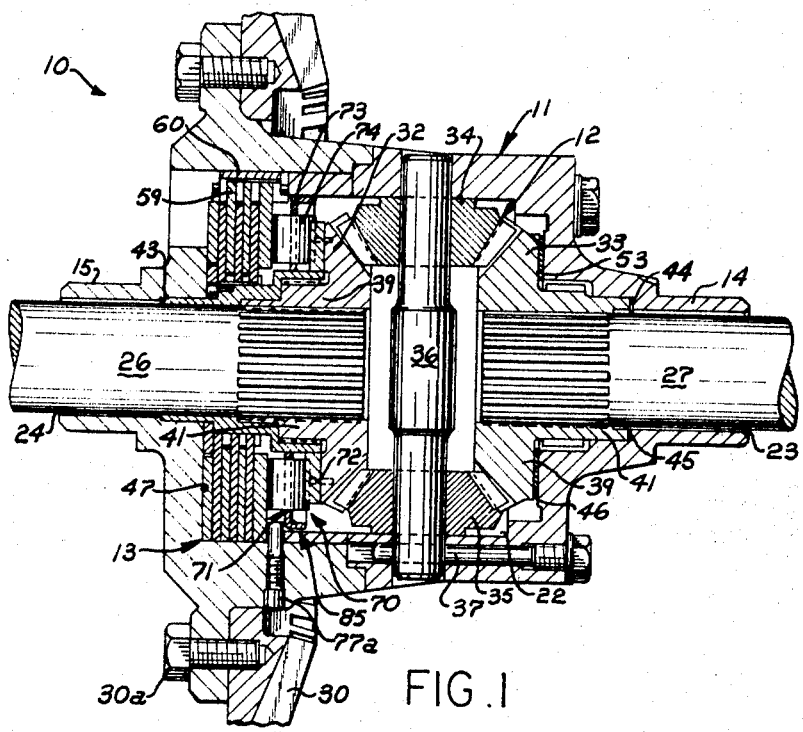
FIG. 1 is an axial sectional view taken through a differential gear mechanism embodying the present invention.
Figure 2:
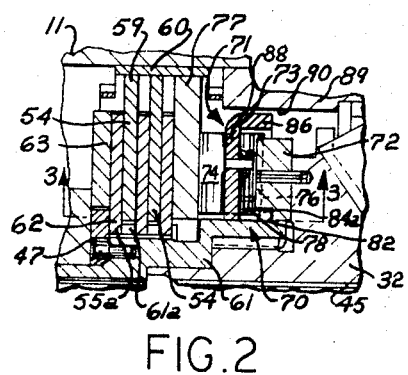
FIG. 2 is an enlarged fragmentary sectional view of a portion of the mechanism shown in FIG. 1.
Figure 3:
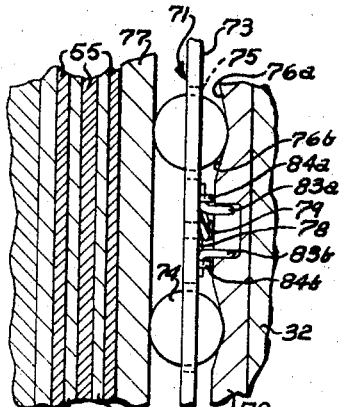
FIG. 3 is a sectional view taken approximately at line 3—3 of FIG. 2.

The invention provides a new and improved differential drive mechanism of the limited slip type. The preferred embodiment of the invention comprises a differential gear mechanism 10 which can be used for various purposes but which is especially suitable for vehicle axle use. The differential mechanism 10 comprises, in general, a rotatable casing 11, a differential gear train 12, and friction clutch means 13, associated with a gear of the gear train and actuated to retard rotation of the gear train relative to the casing and minimize traction wheel slippage, as will be explained hereinafter. While the differential mechanism 10 includes a single clutch means, two such clutch means may be used in certain applications.

The casing 11 is provided with support portions 14 and 15 adapted to be received in bearings of a supporting structure, such as an axle housing (not shown), by which the casing is rotatably supported. The casing 11 is here shown, by way of example, as comprising a two-piece member mating on opposite sides to facilitate assembly and on opposite ends of which the support portions 14 and 15 are formed. The casing 11 is hollow and defines a gear chamber 22 in which the gear train 12 and the friction clutch means 13 is located.

The opposite ends of the casing 11 are provided with openings 23, 24 extending through the portions 14, 15, respectively, and which openings are disposed in an aligned relation on a common axis which is also the rotational axis of the casing 11. The axial openings 23, 24 receive or accommodate the driven or power output shaft means, which is here represented by axle shafts 26, 27 whose outer ends are connected with traction wheels or the like (not shown) and whose inner or adjacent ends are connected with the gear train 12, as will be explained hereinafter.

The differential mechanism 10 also includes a conventional ring gear 30 extending around and mounted on the casing 11 by means of the connecting bolts 30a. A drive pinion, not shown, meshes with the ring gear 30 to provide the power input for the differential mechanism 10.

The gear train 12 comprises a pair of bevel-type side gears 32, 33 and a group of bevel-type idler or pinion gears, in this case, two such gears 34, 35 disposed between and in meshed engagement with the side gears 32, 33 for connecting the latter. The pinions 34, 35 are rotatably supported in the casing 11 as by means of a pinion shaft 36 extending across the gear chamber 22 and secured in the casing by a suitable anchor pin 37 extending through the pinion shaft transversely thereof.

The side gears 32, 33 and the pinion gears 34, 35 are, in the preferred embodiment, all bevel gears of a conventional form, so far as the teeth thereof are concerned, and the tooth profiles are of a conventional shape having pressure angle values coming within the usual range of such values. The side gears 32, 33, while in the preferred embodiment comprise bevel gears, may take other known forms, and each of the gears 32, 33 comprises an annular body 39 having teeth formed thereon and a central hollow sleeve or hub 41 connected with the body and extending coaxially with the axis of rotation of the side gears 32, 33. The casing 11 is provided with hollow annular thrust bearing portions or axial sockets 43, 44 and the side gears 32, 33, respectively, are rotatably supported in the casing by having their hubs 41 rotatably received in these hollow bearings. The side gears 32, 33 are provided with splines 45 in the hub openings thereof and which are engaged by corresponding splines formed on the inner ends of the axle shafts 26, 27 for connecting such shafts with the side gears.

The casing 11 is also provided with annular thrust portions 46, 47 which surround the hollow bearing portions 43, 44, respectively, and are here represented as being flat, rigid end wall surfaces formed on the casing sections and lying in parallel planes extending transversely of the rotation axis in a substantially perpendicular relation to the latter. These annular thrust portions may take other forms and receive or absorb the outward axial thrust of the side gears 33, 32 which results from the pressure angle torque load reaction of the meshed teeth of the gear train 12.

The body 39 of the side gear 33 is provided with an annular thrust portion 53 located in an axially opposed relation to the annular thrust portion 46 and is here shown as being an annularly extending, flat radial surface surrounding the hub 41. The thrust portions 46, 53 are preferably spaced apart by a shim disc interposed therebetween.

The friction clutch means 13 includes friction members which when engaged under sufficient pressure are effective to engage or energize the clutch means and therefore may be termed a pressure responsive clutch means. The clutch means 13 is located between the annular thrust member 47 and the side gear 32 so that axial thrust or loading of the friction clutch means will cause the clutch to be actuated to an engaged or energized condition.

The clutch means 13 is a multi-disc type clutch having a first group of friction disc or plate members 54 drivingly connected to the casing 11 and with the second group of friction disc or plate members 55 drivingly connected to side gear 32. The discs 54, 55 are wetted by a fluid in the casing 11 so that the clutch means 13 may be termed a wet multi-disc clutch.

The connection of the clutch discs 54 to the casing 11 is provided by circumferentially spaced radially extending annular lugs or ears 59 which project from the outer periphery of each of the clutch discs 54. Though other methods of retaining discs might be used, each of the discs is provided with two such anchorage lugs 59 in a diametrically opposed location, only one of which has been shown, see FIG. 1. The lugs 59 project into correspondingly located openings or recesses förmed by a guide member 60 secured in the casing 11. The guide members 60 may be of any suitable construction and correspond in number to the number of lugs 59 formed on each disc 54. Only one such guide member has been illustrated. The lugs 59 cooperate with adjacent portions of the guides 60 to hold the discs 54 against rotation relative to the casing 11. The connection between the discs 54 and the casing 11 provide a large area of contact between sides of the lugs 59 and sides of the guide members and a relatively wide distribution of the driving forces therebetween, minimizing wear of these parts which would be present if the driving forces were concentrated in a small area.

Each of the discs 55 is drivingly connected to a gear extension member 61 which is splined to the hub portion 41 of the gear 32. Each disc is provided with a plurality of radial teeth 55a which engage an annular splined portion 61a of the member 61 to provide a spline connection therebetween. The spline connection of the discs 55 and the side gear 32 and the connection of the clutch discs 54 to the casing 11 permit sufficient axial movement of the clutch discs 54, 55 to effect an engaged or energized condition of the clutch means 13 to drivingly connect the casing 11 and gear 32.

The discs and drive members of the clutch means 13 are preferably always in surface contact so that when the clutch means is disengaged or de-energized, the side gear 32 can rotate relative to the casing 11 by virtue of sliding contact between the clutch discs and drive members. As the clutch means is pressed axially to produce a large engagement pressure between the contacting surfaces thereof, the friction between the discs and drive members increases to a value sufficient to prevent sliding contact therebetween, resulting in an engaged or energized condition of the clutch means. The axial compressive force exerted on the clutch discs when the clutch means 13 is energized is transmitted to inner and outer thrust washers 62 and 63, respectively, which are interposed between the clutch means 13 and the thrust portion 47 of the casing 11. The thrust washers 62, 63 are suitably connected to the gear extension 61a and the casing 11, respectively.

When a wet multi-disc clutch, of the type described herein, is engaged or energized under load, there is a limited amount of slippage which occurs between the discs. This slippage between the discs is effective to prevent sudden shocks of engagement when the clutch means drivingly connects the casing 11 and the side gear 32. It will be appreciated that the axial movement of the clutch discs referred to herein is that axial movement which is sufficient to increase the engaging pressure between the discs 54, 55 to energize the clutch means 13, and may constitute an exceedingly small amount of axial movement.

In accordance with the present invention the discs 54, 55 of the clutch means 13 are moved axially to effect an energized, or engaged condition of the clutch means 13 by the operation of an actuating means 70. In the embodiment of the invention illustrated in FIGS. 1–4, the actuating means 70 is operative to energize the clutch means to drivingly connect the side gear 32 and the casing 11 at a predetermined slip speed therebetween. The actuating means 70 includes a roller cage mechanism 71 supported by an annular ring-like member 72 connected to the side gear 32. The roller cage mechanism 71 includes a roller cage member 73 and a plurality of cylindrical roller members 74.

The cage member 73 is an annular ring-like member which is positioned circumferentially about the hub portion 41 of the side gear 32 and extends radially therefrom toward the casing 11. The cage member 73 includes a plurality of radially extending slots 75 therein which are dimensioned to loosely receive the rollers 74.

The rollers 74 are generally cylindrical members which are disposed in the slots 75 with their axes extending radially of the side gear 32 and transversely of the axis of rotation of the side gear. The rollers 74 are loosely held in the slots 75 but the play therebetween is sufficiently small that the rollers 74 and cage members 73 may move as a unit relative to the side gear 32 under conditions which will be described hereinafter. Additionally, the slots 75 are of such size that the rollers 74 are freely movable in an axial direction relative to the cage member 73. When the rollers 74 are operatively related with the cage member 73 the rollers are engaged with the ring member 72 on the side gear 32 in a manner which will be described in detail hereinafter.

The ring member 72 is provided with a camming surface which comprises a series of radially extending V-groove portions 76 which correspond in number to the rollers 74. Each of the V-grooves 76 includes cam surfaces 76a, 76b with which the rollers 74 are engageable. When the side gear 32 and the roller cage mechanism 71 are rotating at the same speed, the rollers 74 are centered in the grooves 76 so that each of the rollers 74 is supported between the cam surfaces 76a, 76b and a thrust ring 77 connected to the casing 11 in the same manner as described above in reference to the clutch discs 54. When the side gear 32 rotates relative to the roller cage mechanism 71, the cage member 73 is effective to move the rollers circumferentially of the side gear in response to such relative rotation. When the rollers 74 are urged circumferentially of the side gear by the cage member 73, the rollers 74 tend to roll along either the cam surface 76a or the cam surface 76b, depending upon the direction of relative rotation between the gear 32 and the casing 11, and away from the bottom of the V-grooves 76 such that the rollers are moved in an axial direction toward the clutch means 13. As the rollers 74 are moved along either of the cam surfaces 76a, 76b, they urge the thrust ring 77 axially so that the discs 54, 55 of the clutch means are forced into pressure engagement as described hereinabove to provide a soft engagement of the clutch means 13 to drivingly connect the side gear 32 and the casing 11. As shown in FIG. 1 a retainer pin 77a is positioned adjacent the thrust ring 77 to maintain the spacing between the parts of the clutch means 13. Although the V-grooves 76 have been described as formed on the ring 72 it should be apparent that the grooves could be formed on the side gear 32 itself by means of a coining operation for example.

In the illustrated and preferred embodiment, the roller cage mechanism 71 is provided with means for biasing the roller cage mechanism toward its centered position, where the rollers 74 are located at the bottoms of the V-grooves 76. The biasing means preferably comprises a pair of springs 78 only one of which has been illustrated, see FIG. 4. The springs 78 are connected between the cage 73, and the ring member 72 and preferably at diametrically spaced locations. Since the springs 78 are identical, only one will be described herein. The spring 78 is formed by suitable wire and encircles a pin member 79 which is fixed to the cage 73 and which extends toward the ring 72. The spring 78 includes arms 80a, 80b each of which extends generally circumferentially from the pin to an elbow portion 81 thereof. The arms 80a, 80b extend in a generally radial direction from the elbow portions 81a, 81b toward a slot 82 formed on an inner periphery of the ring 72. The slot 82 receives bent over ends 83a, 83b of the spring arms 80a, 80b which extend axially into the slot 82. The spring arms are retained in position by retainer pins 84a, 84b which are secured to the cage 73 and positioned so that the ends 83a, 83b of the spring arms 80a, 80b extend along end surfaces of the slot 82. The spring 78 is effective, in its position shown in FIG. 4, to maintain the roller members 74 in a centered position on the cam surfaces 76a, 76b. When the roller members 74 move along the cam surface of the ring member 72 the cage member 73 is moved correspondingly. This movement of the cage member 73 relative to the ring member 72 causes either the spring arm 80a or the spring arm 80b to be tensioned, depending on the direction of relative movement between the cage member 73 and the ring 72. The spring arms are tensioned as a result of a side of the slot 82 engaging an end portion 83a or 83b of the spring and moving the end relative to the pin member 79. The spring arms, of course, resist this movement and act to urge the cage 73 to a position relative to the ring 72 at which the roller members are centered in the grooves 76.

The actuating means 70 includes means for moving the roller cage mechanism 71 circumferentially relative to the side gear 32 and overcoming the bias of the spring means 78 to effect energization of the clutch means 13. The means for moving the roller cage mechanism, as described, includes a viscous shear fluid coupling 85. The viscous shear fluid coupling 85 is formed in part by a projection 86 formed on the roller cage 71 and which extends radially outwardly of the rollers 74 and to a point adjacent the carrier 11.

The projection 86 forms an axially extending annular flange portion extending around the outer periphery of the cage member 73. The portion 86 has an annular outer surface 88 thereon which lies closely adjacent a surface in the casing 11. A ring member 89 is fixed to an inner wall of the casing 11 and forms an annular surface 90 which co-extends with the surface 88 in parallel relation therewith. The space between the surfaces 88, 90 forms a viscous shear space which contains a viscous shear fluid which is operative to transmit torque between the surfaces 88, 90 in response to relative rotation therebetween, in a manner which is well known to those skilled in the art to which the invention relates. Upon a predetermined speed of relative rotation between the side gear 32 and the casing 11, the surface 88 and the surface 90 will cooperate with the viscous shear fluid to transmit torque between the casing 11 and the roller cage mechanism 71. Transmission of torque between the casing 11 and the roller cage mechanism 71 is related to the speed of relative rotation therebetween and increases as relative rotation increases. The torque is of course operative to provide a circumferentially acting force on the roller cage mechanism which tends to move the roller cage mechanism relative to the side gear 32. When relative rotation between the surfaces 88, 90 reaches a predetermined speed, the circumferential force is of sufficient value to overcome the biasing force of the spring means 78 and moves the roller cage mechanism 71 relative to the side gear 32. Movement of the roller cage mechanism 71 relative to the side gear 32 results in movement of the rollers 74 axially relative to the side gear 32 to move the discs 54, 55 of the clutch means 13 into pressure engagement.

Figure 5:
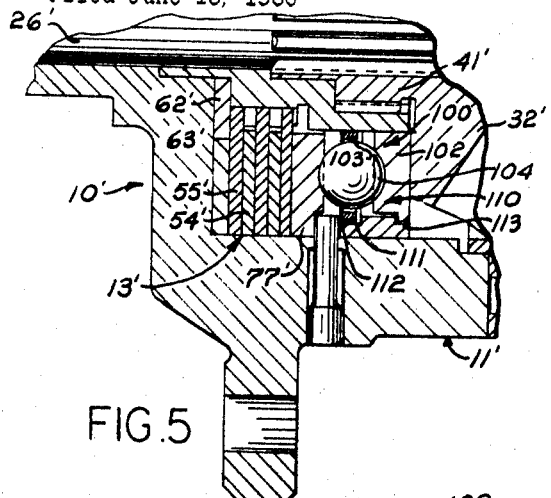
FIG. 5 is a fragmentary view of a modification of the mechanism shown in FIG. 1.

FIGS. 5–8 illustrate a modified differential mechanism embodying the present invention and parts therein which are similar to parts previously described are designated by corresponding primed reference characters. FIG. 5 is an illustration of a portion of a differential mechanism 10', which differential mechanism is substantially the same as that described above in reference to FIGS. 1–4 and reference should be made to that description for an understanding of the operation of the differential mechanism 10'. As illustrated in FIG. 5, a side gear 32' is splined to an axle shaft 26' for rotation therewith and is located in a gear chamber of the casing 11'. The casing 11' and side gear 32' are rotatable relative to each other as previously described and are adapted to be drivingly connected by a clutch means 13'.

The clutch means 13' is a multiple disc-type clutch including discs 54' connected to the casing 11' and which are interleaved with discs 55' connected to the side gear 32' for rotation therewith. The connections between the discs 54' and the casing 11', and the discs 55' and the side gear 32' respectively, are the same as described in reference to FIGS. 1–4. The clutch discs 54', 55' are exposed to oil in the gear chamber of the casing 11' so that the clutch means 13' may be termed a wet multiple disc-type clutch.

The clutch means 13' is energized to drivingly connect the casing 11' to the side gear 32' upon axial compressive engagement of the discs 54', 55' thereof with each other. A thrust plate 77' and a pair of thrust washers 62', 63' are disposed on opposite axial sides of the clutch means 13' to distribute axial forces developed when the clutch means 13' is energized as will be described hereinafter.

The clutch means 13' includes actuating means 100 effective to energize the clutch means 13' in response to relative rotation between the side gear 32' and casing 11'. The actuating means 100 includes a roller cage mechanism 101 supported between an annular ring-like member 102 connected to the side gear 32' and the thrust plate 77'. The roller cage mechanism 101 includes a roller cage member 103 and a plurality of spherical roller members 104.

The cage member 103 is an annular ring-like member which is positioned circumferentially about a hub portion 41' of the side gear 32'. The cage member 103 includes a plurality of circular openings 105 which are of slightly larger diameter than the roller members 104. The roller members 104 are loosely held in the openings 105 but the play therebetween is sufficiently small that the roller members 104 and cage member 103 may move as a unit relative to the side gear 32' under conditions which will be described hereinafter. When the roller members 104 are operatively related with the cage member 103 the rollers are engaged with the ring member 102 connected to the side gear 32'.

Figure 6:
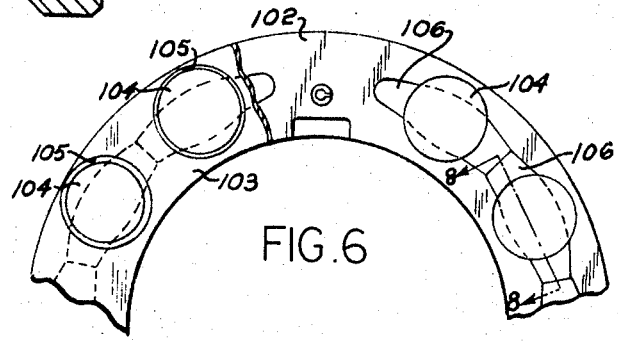
FIG. 6 is a fragmentary elevational view of a portion of the mechanism shown in FIG. 5 on an enlarged scale.
Figure 8:
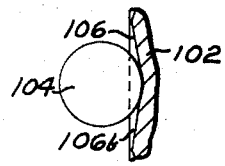
FIG. 8 is a sectional view taken approximately along line 8—8 of FIG. 6.
Figure 4:
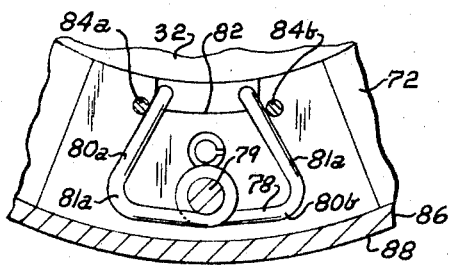
FIG. 4 is a fragmentary view of a portion of the mechanism shown in FIG. 2 but on an enlarged scale.

The ring member 102 is provided with a camming surface which comprises a series of groove portions 106 which correspond in number to the number of roller members 104. The grooves 106 extend circumferentially along the ring member 102 and are formed to provide an arcuate bottom portion thereof having a center of curvature corresponding to the center of curvature of the roller members 104. As shown in FIG. 6, the grooves 106 are deepest at a portion intermediate their ends to provide a pair of cam ramps 106a, 106b, best seen in FIG. 8. When the side gear 32' and the roller cage mechanism 101 are rotating at the same speed, the roller members 104 are centered in the grooves 106 so that each of the rollers 104 is supported on the cam ramps 106a, 106b of the ring 102.

Figure 7:
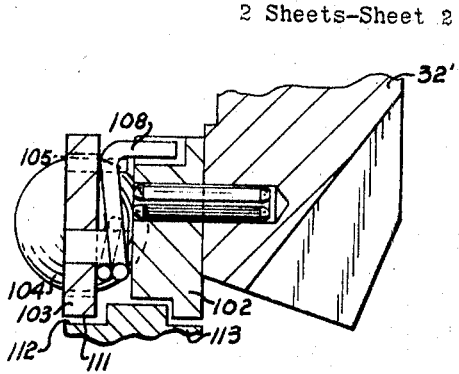
FIG. 7 is a sectional view of a portion of the mechanism shown in FIG. 5 and on an enlarged scale.

The thrust ring 77' is connected to the casing 11' as described hereinabove in reference to FIGS. 1–4 and is held against rotation relative thereto. The thrust ring 77' includes an annular groove extending circumferentially therearound forming a ball race 107 which cooperates with the roller members 104. The ring member 102 is connected to the side gear 32' by suitable means such as a roll pin, as illustrated in FIG. 7, and is held against rotation relative to the side gear 32'. When the side gear 32' rotates relative to the casing 11' the ring member 102 rotates relative to the thrust ring 77' causing the roller members 104 to move circumferentially in the grooves 106 relative to the side gear 32' in response to such relative rotation. When the roller members 104 are urged circumferentially of the side gear 32' the rollers 104 tend to roll along either the cam ramp 106a or the cam ramp 106b, depending upon the direction of relative rotation between the side gear 32' and casing 11'. When the roller members 104 roll along the cam ramps 106a or 106b, they are, of course, moved in an axial direction toward the clutch means 13'. Movement of the roller members 104 toward the clutch means 13' moves the thrust ring 77' axially to urge the discs 54', 55' of the clutch means 13' into pressure engagement as described above to drivingly connect the side gear 32' and casing 11'. It should be apparent from the above that the roller cage mechanism 101 is moved circumferentially relative to the side gear 32' in response to relative rotation between the side gear 32' and the casing 11' to effect energization of the clutch means 13'.

The roller cage mechanism 101 is provided with means for biasing the roller cage mechanism toward its centered position, wherein the rollers 104 are located at the bottoms of the grooves 106. The biasing means preferably comprises a pair of springs 108, only one of which has been illustrated. The spring 108 is connected between the cage member 103 and the ring 102 in the same manner as described above in reference to FIG. 4 and is effective to resist movement of the roller members 104 along the cam ramps 106a, or 106b as well as to return the rollers 104 to the bottoms of their respective grooves 106 when the clutch means 13' is disengaged.

The actuating means 100 includes means for moving the roller cage mechanism 101 relative to the side gear 32' and overcoming the bias of the spring means 108. The means for moving the roller cage mechanism includes a fluid coupling 110. The fluid coupling 110 is effective at a predetermined speed of relative rotation between the casing 11' and the side gear 32' to energize the clutch means 13' as described to limit slipping of the gear and casing and lock the differential mechanism. The fluid coupling 110 includes an annular surface 111 on the roller cage mechanism positioned closely adjacent an annular surface 112 formed on a ring 113 fixed in the casing 11'. The casing 11' contains a viscous fluid which cooperates with the surfaces 111, 112 in a manner similar to that described above in reference to FIGS. 1–4. When the casing 11' rotates relative to the side gear 32', the fluid in the casing 11' interacts with the roller cage mechanism to energize the clutch means 13'.

It can now be seen that a new and improved drive mechanism has been provided wherein driving and driven members are drivingly connected by a friction clutch means, and wherein the friction clutch is associated with an actuating means which includes axially movable members effective to energize the clutch means in response to relative rotation between the driving and driven members.

Although two preferred embodiments of the present invention have been shown and described herein in considerable detail, it should be understood that certain modifications, adaptations and changes may be made without departing from the present invention. It is my intention to cover hereby all such modifications, changes and adaptations which fall within the scope of the appended claims.

Having described my invention, I claim:

1. A drive mechanism comprising driving and driven members, clutch means operatively associated with said members and operable between a first condition wherein said driving and driven members are drivingly connected and a second condition permitting relative rotation between said driving and driven members, said clutch means including friction members cooperating with said driving and driven members and having a frictional pressure engagement therebetween to drivingly connect said driving and driven members when said clutch means is in said first condition, and actuating means operative in response to a predetermined rate of relative rotation between said driving and driven members for operatively interconnecting said driving and driven members and for applying an engaging force to said clutch means to actuate said clutch means from said second condition to said first condition to drivingly connect said driving and driven members through said clutch means and said actuating means.

2. A drive mechanism as defined in claim 1 wherein said actuating means includes a force transmitting member operable to actuate said clutch means by urging said friction members into pressure engagement, said force transmitting member being movable axially relative to one of said driving and driven members in response to relative rotation between said driving and driven members.

3. A drive mechanism as defined in claim 2 and further including a cam surface fixed relative to one of said driving and driven members and engaging said force transmitting member, said cam surface operable to move said force transmitting member axially of said one member in response to movement of said force transmitting member relative thereto.

4. A drive mechanism as defined in claim 2 and further including biasing means operative to urge said force transmitting member to a position wherein said clutch means is in said second condition, said actuating means moving said force transmitting member against said bias to overcome said biasing means and effect actuation of said clutch means to said first condition.

5. A drive mechanism comprising driving and driven members, clutch means operatively associated with said members and operable between a first condition wherein said driving and driven members are drivingly connected and a second condition permitting relative rotation between said driving and driven members, said clutch means including friction members cooperating with said driving and driven members and having a frictional pressure engagement therebetween to drivingly connect said driving and driven members when said clutch means is in said first condition, and actuating means for applying an engaging force to said clutch means to actuate said clutch means between said first and second conditions, means relative to one of said driving and driven members to said actuating means including cam means connected to one of said driving and driven members, a thrust ring connected to the other of said driving and driven members, force transmitting means located between said thrust ring and said cam means, actuator means connected with said force transmitting means for moving said force transmitting means in a generally circumferential direction relative to said cam means and said one of said driving and driven members to effect axial movement of said thrust ring and force transmitting means relative to said one of said driving and driven members to thereby apply an axial pressure to said clutch means to operate said clutch means from said second condition to said first condition.

6. A drive mechanism as defined in claim 5 wherein said actuator means includes an annular member associated with said force transmitting means and fluid coupling means for moving said annular member in response to relative rotation between said driving and driven members, to thereby effect said circumferential movement of said force transmitting means.

7. A drive mechanism as defined in claim 6 wherein said force transmitting means includes a roller member loosely held in an opening in said annular member, said roller member movable axially relative to said one member to actuate said clutch means to said first condition, and further including biasing means acting between said annular member and said one member and urging said force transmitting means against axial movement relative to said one member.

8. A mechanism as defined in claim 6 wherein said force transmitting means includes a plurality of cylindrical roller members located in annularly spaced apart openings in said annular member.

9. A mechanism as defined in claim 8 wherein said rollers are located circumferentially about said one member with their longitudinal axes extending transversely of an axis of rotation of said one member and said cam means comprises a plurality of generally V-shaped grooves extending radially of said one member.

10. A mechanism as defined in claim 6 wherein said force transmitting means includes a plurality of spherical roller members located in annularly spaced apart openings in said annular member.

11. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means to effect rotation of said output means upon rotation of said side gears and a rotatable planet carrier drivingly connected with said input means and at least one planetary gear rotatably mounted on said planet carrier and meshing with said side gears to drive the same, clutch means located between spaced surfaces on said carrier and said differential gear means, said clutch means operable between a first condition wherein said input means and one of said output means are drivingly connected and a second condition permitting relative rotation between said input and output means, said clutch means including a plurality of friction members having a frictional pressure engagement therebetween to drivingly connect said input and said one output means when said clutch means is in said first condition, and actuating means for applying an engaging force to said clutch means to actuate said clutch means between said first and second conditions, said actuating means including force transmitting means engaging one of said spaced surfaces and movable toward and away from said other surface, and means for moving said force transmitting means relative to said one surface in response to a predetermined rate of relative rotation between said input means and said one output means to effect actuation of said clutch means.

12. A drive mechanism as defined in claim 11 wherein said means for moving said force transmitting means relative to said one surface in response to relative rotation between said input means and said one output means includes fluid coupling means.

13. A drive mechanism comprising driving and driven members, clutch means operatively associated with said members and operable between a first condition wherein said driving and driven members are drivingly connected and a second condition permitting relative rotation between said driving and driven members, said clutch means including friction members cooperating with said driving and driven members and having a frictional pressure engagement therebetween to drivingly connect said driving and driven members when said clutch means is in said first condition, and actuating means for applying an engaging force to said clutch means to actuate said clutch means between said first and second conditions in response to relative rotation between said driving and driven members, said actuating means including a force transmitting member operable to actuate said clutch means by urging said friction members into pressure engagement, said force transmitting member being movable axially relative to one of said driving and driven members in response to relative rotation between said driving and driven members, a cam surface fixed relative to one of said driving and driven members and engaging said force transmitting member, said cam surface operable to move said force transmitting member axially of said one member in response to movement of said force transmitting member relative thereto, and a fluid coupling means operable to move said force transmitting member relative to said cam surface in response to a predetermined speed of relative rotation between said driving and driven members.

14. A drive mechanism comprising driving and driven members, clutch means operatively associated with said members and operable between a first condition wherein said driving and driven members are drivingly connected and a second condition permitting relative rotation between said driving and driven members, said clutch means including friction members cooperating with said driving and driven members and having a frictional pressure engagement therebetween to drivingly connect said driving and driven members when said clutch means is in said first condition, and actuating means for applying an engaging force to said clutch means to actuate said clutch means between said first and second conditions in response to relative rotation between said driving and driven members, said actuating means including a force transmitting member operable to actuate said clutch means by urging said friction members into pressure engagement, said force transmitting member being a roller member movable axially relative to one of said driving and driven members in response to relative rotation between said driving and driven members, said actuating means includes a fluid coupling operable to move said roller member circumferentially relative to one of said driving and driven members and a cam surface lying in a plane extending at an acute angle to an axis of rotation of said one member, said roller member engaging said cam surface and moving along said surface in response to circumferential movement thereof relative to said one member by said fluid coupling, with said force transmitting member moving axially relative to said one member as movement thereof along said cam surface is effected.

15. A drive mechanism comprising driving and driven members, clutch means operatively associated with said members and operable between a first condition wherein said driving and driven members are drivingly connected and a second condition permitting relative rotation between said driving and driven members, said clutch means including friction members cooperating with said driving and driven members and having a frictional pressure engagement therebetween to drivingly connect said driving and driven members when said clutch means is in said first condition, and actuating means for applying an engaging force to said clutch means to actuate said clutch means between said first and second conditions, said actuating means including force transmitting means operable to actuate said clutch means by urging said friction members into said pressure engagement, means for effecting axial movement of said force transmitting means relative to one of said driving and driven members to cause said pressure engagement, an annular member operatively associated with said force transmitting means and means for moving said annular member in response to relative rotation between said driving and driven members, movement of said annular member effecting movement of said force transmitting means circumferentially relative to one of said members, said means for moving said annular member including a viscous shear fluid coupling having a first shear surface thereof formed by a part of said annular member and a second shear surface thereof fixed to the other of said driving and driven members, said shear surfaces being spaced apart and adapted to receive a viscous shear fluid therebetween.

16. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means to effect rotation of said output means upon rotation of said side gears and a rotatable planet carrier drivingly connected with said input means and at least one planetary gear rotatably mounted on said planet carrier and meshing with said side gears to drive the same, clutch means located between spaced surfaces on said input means and said differential gear means, said clutch means operable between a first condition wherein said input means and one of said output means are drivingly connected and a second condition permitting relative rotation between said input and output means, said clutch means including a plurality of friction members having a frictional pressure engagement therebetween to drivingly connect said input and said one output means when said clutch means is in said first condition, and actuating means for applying an engaging force to said clutch means to actuate said clutch means between said first and second conditions, said actuating means including force transmitting means engaging one of said spaced surfaces and movable toward and away from said other surface in response to relative rotation between said input means and said one output means to effect actuation of said clutch means, one of said surfaces being formed on said planet carrier and the other surface is formed on one of said side gears, one of said surfaces comprising a cam surface operable to effect axial movement of said force transmitting means upon movement of said force transmitting means relative thereto, and means for moving said force transmitting means relative to said one surface in response to relative rotation between said input means and said one output means, said means for moving said force transmitting means includes a viscous shear fluid coupling operable on relative rotation between said input means and said one output means to move said force transmitting means circumferentially relative to one of said input and output means and relative to said cam surface.

17. A drive mechanism as defined in claim 16 wherein said cam surface is formed on said one side gear and comprises a plurality of V-grooves extending radially of said side gear, and said force transmitting means comprises a plurality of roller members disposed in said grooves.

18. A drive mechanism comprising driving and driven members, clutch means operatively associated with said members and operable between a first condition wherein said driving and driven members are drivingly connected and a second condition permitting relative rotation between said driving and driven members, said clutch means including friction members cooperating with said driving and driven members and having a frictional pressure engagement therebetween to drivingly connect said driving and driven members when said clutch means is in said first condition, and actuating means for applying an engaging force to said clutch means to actuate said clutch means between said first and second conditions, said actuating means including force transmitting means operable to actuate said clutch means by urging said friction members into said pressure engagement and means for effecting axial movement of said force transmitting means relative to one of said driving and driven members to cause said pressure engagement, said actuating means including an annular member operatively associated with said force transmitting means and means for moving said annular member in response to relative rotation between said driving and driven members, movement of said annular member effecting movement of said force transmitting means circumferentially relative to one of said members, said force transmitting means including a roller member loosely held in an opening in said annular member, said roller member movable axially relative to said one member to actuate said clutch means to said first condition, and further including biasing means acting between said annular member and said one member and urging said force transmitting means against axial movement relative to said one member, said biasing means including a spring member fixed to said annular member for movement therewith and having a spring arm portion engageable with a surface on said one member and biasing said clutch means toward its second condition, said annular member moving relative to said one member at a predetermined speed of relative rotation between said driving and driven members to overcome the bias of said spring arm and effect a driving connection between said driving and driven members.

19. A drive mechanism comprising driving and driven members, clutch means operatively associated with said members and operable between a first condition wherein said driving and driven members are drivingly connected and a second condition permitting relative rotation between said driving and driven members, said clutch means including friction disc members respective ones of which have a driving connection with a respective one of said driving and driven members and having a frictional pressure engagement therebetween to drivingly connect said driving and driven members, and actuating means for applying an engaging force to said clutch means to actuate said clutch means between said first and second conditions in response to relative rotation between said driving and driven members, said actuating means including fluid coupling means responsive to a predetermined speed of relative rotation between said driving and driven members for actuating said clutch means upon the occurrence of said predetermined speed of relative rotation between said driving and driven members.

References Cited

UNITED STATES PATENTS

| | | | |
|---|---|---|---|
| 1,585,140 | 5/1926 | Erban | 192—93 X |
| 1,683,715 | 9/1928 | Erban | 192—93 X |
| 1,777,024 | 9/1930 | Wildhaber | 74—711 |
| 2,446,138 | 7/1948 | Lambert | 192—93 |
| 2,827,994 | 3/1958 | Tiedeman et al. | 192—93 |
| 3,175,661 | 3/1965 | Maurer et al. | 192—45.1 |
| 3,211,022 | 12/1965 | Anderson | 74—711 |
| 3,253,483 | 5/1966 | McCaw | 74—711 |

FRED C. MATTERN, JR., *Primary Examiner.*

ARTHUR T. McKEON, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,585                                               October 8, 1968

Daniel W. Roper

It is certified that error appears in the above identified patent and that said Letters Patent are hereby corrected as shown below:

Column 9, lines 17 and 18, cancel "means relative to one of said driving and driven members to".

Signed and sealed this 10th day of March 1970.

(SEAL)
Attest:

Edward M. Fletcher, Jr.                           WILLIAM E. SCHUYLER, JR.
Attesting Officer                                           Commissioner of Patents